United States Patent [19]

Gordon et al.

[11] 3,870,690

[45] Mar. 11, 1975

[54] PROCESS FOR THE POLYMERIZATION OF ALPHA-OLEFINS

[75] Inventors: Wolfgang Gordon, Hofheim, Taunus; Kurt Rust, Frankfurt am Main; Erwin Schrott, Sulzbach, Taunus, all of Germany

[73] Assignee: Hoechst Aktiengesellschaft, Frankfurt am Main, Germany

[22] Filed: Apr. 10, 1973

[21] Appl. No.: 349,755

[30] Foreign Application Priority Data
Apr. 15, 1972 Germany............................ 2218345

[52] U.S. Cl....... 260/88.2 R, 260/93.7, 260/94.9 C, 260/94.9 CA, 260/268 DK, 260/94.9 CB
[51] Int. Cl....... C08f 15/04, C08f 19/02, C08f 3/02
[58] Field of Search. 260/94.9 CA, 94.9 C, 268 DK, 260/88.2 R, 93.7

[56] References Cited
UNITED STATES PATENTS

| | | | |
|---|---|---|---|
| 3,050,471 | 8/1962 | Anderson et al............... | 260/94.9 C |
| 3,189,590 | 6/1965 | Coover et al................ | 260/94.9 CA |
| 3,205,208 | 9/1965 | Coover et al................ | 260/94.9 CA |
| 3,534,006 | 10/1970 | Kamaishi et al. .............. | 260/94.9 C |
| 3,549,396 | 12/1970 | Dietz............................ | 260/268 DK |
| 3,639,375 | 2/1972 | Staiger et al.................. | 260/94.9 C |
| 3,655,812 | 4/1972 | Langer, Jr...................... | 260/94.9 E |
| 3,752,797 | 8/1973 | Gordon.......................... | 260/94.9 C |

FOREIGN PATENTS OR APPLICATIONS

| | | | |
|---|---|---|---|
| 759,544 | 5/1967 | Canada.......................... | 260/94.9 C |

Primary Examiner—Joseph L. Schofer
Assistant Examiner—T. S. Gron
Attorney, Agent, or Firm—Curtis, Morris & Safford

[57] ABSTRACT

The invention relates to a process for the preparation of olefin polymers using a modified Ziegler-catalyst. As modifiers cyclic dipeptides are used. Polymers are obtained in a high yield having good crystallinity and good color quality.

4 Claims, No Drawings

PROCESS FOR THE POLYMERIZATION OF ALPHA-OLEFINS

The present invention relates to a process for the polymerization of α-olefins.

It has been known for quite a long time that the stereo-specificity of the polymerization of α-olefins, in the presence of halogen-free, organo-aluminium, compounds and halogen compounds of the trivalent titanium, can be improved by adding stereo-regulators containing nitrogen, whereby the activity of the catalyst system falls to a varying degree. Thus, in Australian Pat. No. 247,451 processes with amines, and, in U.S. Pat. No. 3,189,590 processes with amides as stereoregulators are protected. On carrying out the processes claimed therein it has been found that in the gas phase polymerization of α-olefins the stereospecificity is not generally influenced by all the compounds of these classes, but only by some of them. Further, it has been found that when using most of these compounds influencing the polymerization stereospecificity the catalyst activity decreases so much so that they are unsuitable for carrying out an economic polymerization process. Furthermore, with the use of many amines and amides, in a gas phase the polymerization activity slackens in time if a steel reactor is used, and a generally green-blue coating forms on the wall of the reactor. This phenomenon can obviously be explained by complex formation of the added components with alloy constituents of the reactor wall of stainless steel. A further serious disadvantage of processes using amines or amides as catalyst components is the fact that in the subsequent processing of polymers prepared in the gas phase a more or less pronounced disagreeable odor occurs due to the evaporation of these compounds or their reaction or decomposition products. Furthermore in many gas phase polymerizations no products are obtained which are satisfactory in colour.

The object of the invention is a process for the preparation of a crystalline polyolefin by polymerization of at least one α-olefin of the formula $CH_2=CH-R$, wherein R represents an aliphatic radical having from one to four carbon atoms, in suspension or in the gas phase, at a temperature of from 20° to 130°C and a pressure of from 1 to 50 kg/cm², wherein the polymerization is carried out with a mixed catalyst, which is prepared from a. a halogen compound of the trivalent titanium (component A)
b. a halogen-free organo-aluminium compound (component B)
c. a cyclic dipeptide derivative of the formula

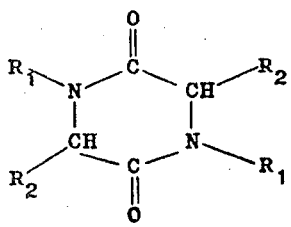

wherein $R_1$ represents $C_6H_5-CH_2$ or $C_nH_{2n+1}$ and $n = 1$ to 4 and $R_2$ represents H, $C_6H_5-CH_2$ or $C_nH_{2n+1}$ and $n = 1$ to 4 (component C) and optionally additionally
d. a phosphoric acid-N-alkyl amide of the formula

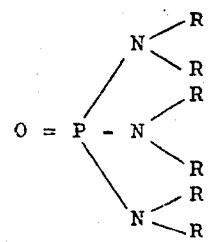

wherein R represents identical or different aliphatic hydrocarbon radicals having up to 4 carbon atoms and wherein the radicals R can also be connected with one another (component D)

A further object of the invention is a polymer of at least one α-olefin of the formula $CH_2=CH-R$, wherein R represents an aliphatic radical having from 1 to 4 carbon atoms, which is prepared by polymerization in suspension or in the gas phase at a temperature of from 20° to 130°C and a pressure of from 1 to 50 kg/cm² with the aid of a mixed catalyst, which is prepared from a. a halogen compound of the trivalent titanium (component A)
b. a halogen-free, organo-aluminium compound (component B)
c. a cyclic dipeptide derivative of the formula

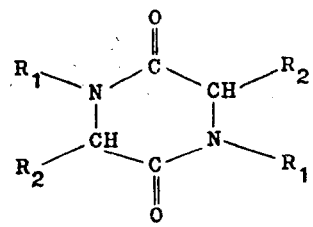

wherein $R_1$ represents $C_6H_5-CH_2$ or $C_nH_{2n+1}$ and $n = 1$ to 4 and $R_2$ represents H, $C_6H_5-CH_2$ or $C_nH_{2n+1}$ and $n = 1$ to 4 (component C) and optionally additionally
d. a phosphoric acid-N-alkyl amide of the formula

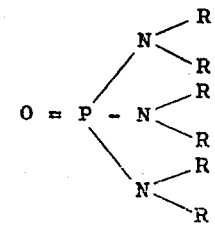

wherein R represents identical or different aliphatic hydrocarbon radicals having up to four carbon atoms and wherein the radicals R can also be connected with one another (component D)

As a halogen compound of the trivalent titanium (component A) preferably chlorine compounds are used in the process of the invention, which were prepared by the reduction of $TiCl_4$ by aluminium, hydrogen, by Grignard compounds or by organo-aluminium compounds. Especially suitable are compounds of the approximate formula $TiCl_3.1/3\ AlCl_3$, which can be prepared by reduction of TiCl$_4$ with Al or also by reacting TiCl$_3$ with AlCl$_3$ under grinding conditions. The component A can be used in ground or in non-ground form, according to the preparation process for the catalyst.

Especially suitable as the halogen-free, organoaluminium compound (component B) are branched or unbranched, unsubstituted aluminium alkyls, such as aluminium trimethyl, aluminium triethyl, aluminium triisobutyl, aluminium tridiisobutyl, aluminium diisobutyl hydride and aluminium isoprenyl in the form described in German Pat. Specification 1,183,084 or in German Auslegeschrift 1,960,051. Aluminium triethyl is especially suitable. The molar ratio of the component B to the component A is between 0.5 : 1 and 15 : 1, preferably between 1.0 : 1 and 8 : 1.

As mixed catalyst component C are used for example sarcosine anhydride (= N,N -dimethyl-1,4-diketopiperazine), N,N-dibenzylalanine anhydride, N,N-dimethylvaline anhydride, N,N-dimethylisoleucine anhydride or N,N-dimethylphenylalanine anhydride. The best results are obtained with sarcosine anhydride. The molar ratio of the component C to the component A is between 0.1 : 1 and 3 : 1, preferably between 0.3 : 1 and 1.5 : 1.

As mixed catalyst component D which may be added, preferably phosphoric acid hexamethyltrisamide is used. But also with other amides, such as phosphoric acid hexaethyltrisamide or phosphoric acid trisethylene imide good results are obtained. The molar ratio of the component D to the component A is from 0.2 : 1 to 10 : 1, preferably from 0.5 : 1 to 3 : 1. When using the component D a smaller amount of component C necessary may be used than without the addition of component D.

The catalyst components can be used in pure form, in dissolved or in suspended form. Liquid, inert hydrocarbons are preferred solvents or suspension agents. The catalyst components can also be mounted on carrier material which should consist preferably of the poly-α-olefin to be prepared. The mixing or reaction of the catalyst components is carried out in a suitable way either before the polymerization or in the polymerization vessel. A preferred form of preparation of the catalyst combination consists of reacting component B with component C and optionally component D in an inert hydrocarbon as diluent at from 0° to 100°C and mixing in the reactor with component A. The catalyst components are introduced into the reactor in a way which ensures an even distribution therein i.e., they are added at the same time in separate places, if possible, and/or with successive addition at sufficient intervals, so that the formation of inhomogenous product is substantially prevented.

The quantities of the mixed catalyst components A and B used in carrying out the process of the invention are dependent on the monomen to be polymerized, the monomer partial pressure, the type of the components A and B and also on whether the polymerization is carried out in suspension without pressure or under pressure or in the gas phase. Further the quantity of component A used depends to a considerable extent on the content of impurities of the monomers used, which partly cannot be determined analytically. Furthermore, the catalyst concentration to be used decreases with increasing pressure and increasing gas quality and increases with the number of carbon atoms in the α-olefin. In general, the quantity of catalyst component A is from 0.05 to 10 mmols per liter of dispersing agent in suspension polymerizations, preferably from 0.1 to 5 mmols per liter of dispersing agent. When polymerizing in the gas phase from 0.0005 to 1 mmol per liter of reactor volume are necessary, preferably from 0.005 to 0.5 mmol per liter of reactor volume. In the gas phase process the catalyst quantity used in strongly dependent on the reactor type used. For the process of the invention all types of agitator reactors, fluidization reactors and coil shaped reactors may be used.

According to the process of the invention all α-olefins of the structure $CH_2 = CH-R$, wherein $R = C_nH_{2n+1}$ and $n = 1$ to 4 such as propylene, butene, 4-methylpentene can be polymerized. The advantages in the polymerization of propylene have proved especially great. Also with the polymerization of mixtures of α-olefins with one another or with ethylene good results are obtained, the ethylene content being from 0.5 to 6 percent by weight, preferably from 1 to 4 percent by weight. Furthermore, block polymerization, in which the monomers are introduced alternately into the polymerization vessel is suitable for polymerizing the above-mentioned α-olefins with one another or with ethylene, the content of ethylene units being from 5 to 35 percent by weight preferably from 7 to 25 percent by weight. Copolymerizations and sequence polymerizations of propylene with ethylene can be carried out in these limits with especially good results. Copolymerization of propylene with up to 15 percent by weight butene is a further preferred embodiment of the invention.

The process of the invention can be carried out in the presence of a liquid, preferably inert aliphatic hydrocarbons with a boiling range of from 60° to 180°C or liquefied α-olefins, wherein the crystalline poly-α-olefin precipitates. The process using scarcely any liquid diluent in the gas phase is especially advantageous wherein the atactic portions of the product may remain in the product or can be dissolved out with a suitable solvent such as aliphatic hydrocarbons, having a boiling range of from 60° to 200°C.

The temperature range of the process of the invention is from 20° to 130°C. When polymerizing ini suspension the temperature is preferably in the range of from 40° to 80°C and when polymerizing in the gas phase, it is preferably from 70° to 110°C.

The pressure range of the process of the invention is from 1 to 50 kg/cm². If the polymerization is carried out in an inert diluent a pressure of from 1 to 15 kg/cm² is preferred. Using the suspension polymerization in a liquefied α-olefin and using the gas phase polymerization a pressure of from 15 to 45 kg/cm² is preferred. A pressure of from 20 to 40 kg/cm² is especially preferred, whereby in the case of the block polymerization with ethylene the ethylene partial pressure can be lower.

All the modifications of the process of the invention can be carried out continuously as well as discontinuously. The molecular weight is regulated preferably with hydrogen during the polymerization or adjusted after the polymerization by thermo-mechanical decomposition.

The advantage of the process of the invention compared to similar processes using amines or amides as catalyst components, is in the improvement of the relation between catalyst activity and stereospecificity of the catalyst. This means that polymerization can be carried out under the same reaction conditions according to the proportions of the catalyst constituents, either more quickly or stereospecifically, or that both advantages can be obtained using suitable catalyst mixtures. Furthermore, in gas phase polymerizations even after a long operating time neither a coating of the additional catalyst components on the reactor wall nor an an effect inhibiting the polymerization through the influence of these components on the reactor wall were observed. Contrary to the above known processes no disagreeable odor occurred during the process, even after storing the product for months in damp air. The poly-α-olefins prepared in the gas phase had a better quality of color than many poly-α-olefins which were prepared according to the above processes.

The process of the invention, therefore, provides polymers in a high yield with good crystallinity and good colour quality.

The following Examples illustrate the invention. The $TiCl_3$–1/3 $AlCl_3$ used in the examples and also in the comparative experiment is characterized by the following specifications: $TiCl_4$-content 0.2 percent; extensively δ-modification, particle size 40 percent smaller than 44μm, 35 percent between 44 and 75 μm, 25 percent between 74 and 144 μm.

EXAMPLE 1

1.0 kg of polypropylene having a reduced specific viscosity of 3.2 dl/g (0.1 percent in dekahydro naphthalene, 135°C) and 13.3 percent parts soluble in heptane (24-hour Soxhlet extraction) were placed in a horizontal 40 l reactor of stainless steel with agitator scraping along the wall. The reactor was flushed by pressurizing it to 10 kg/cm² with propylene and releasing the pressure five times and heated to 90°C. A suspension of 18 mmols of $TiCl_3$.1/3 $AlCl_3$ in 25 ml of heptane was added while stirring. After stirring for ten minutes, a solution was added which as obtained by reacting 72 mmols of aluminium triethyl with 10.8 mmols of sarcosine anhydride in 50 of heptane at 35°C in 15 minutes reaction time. The components were mixed with the product in the reactor for 10 minutes. All the operations took place with the exclusion of oxygen and moisture. Subsequently, 2.3 kg/h propylene were introduced and at the same time a quantity of hydrogen was introduced such that the $H_2$-concentration was 1.2 percent by volume during the duration of the experiment. The inside temperature was 90°C during the experiment. The pressure rose quickly at the beginning and later slowly and reached 20 kg/cm² after 5 hours and 40 minutes. Subsequently polymerization was continued for a further hour and 20 minutes at 20 kg/cm² and while adding a decreasing amount of gas. Then, the pressure was released and without further purification 14.6 kg of while polypropylene were obtained. After deduction of the initial polypropylene quantity the yield was 13.6 kg. The product had a reduced specific viscosity (0.1 percent in decahydro naphthylene, 135°C) of 2.5 dl/g and 14.2 percent was soluble in heptane (24 hours extraction time in the Soxhlet).

After a further 45 polymerizations which were carried out in a similar way with altered $H_2$-concentration, reaction temperature and mixing ratios of the catalyst components, no reactor deposit was observed and no activity decrease through wall effects was ascertained. With the extrusion of this material (worm temperature 200°C, nozzle temperature 260°C) nothing more than a normal odor was noted. A sample was extruded after 6 months storage. Also here there was no disagreeable odor.

EXAMPLE 2

Under otherwise similar conditions, a catalyst system of 72 mmols of aluminium triethyl, 18 mmols of $TiCl_3$.1/3 $AlCl_3$, 3.6 mmols phosphoric acid hexamethyltrisamide and 7.2 mmols of sarcosine anhydride was used. The phosphoric acid hexamethyltrisamide was added likewise to the aluminium triethyl solution and the titanium components were used as powder mixture with 25 g of polypropylene. After 6 hours a pressure of 19.2 kg/cm² was reached. The pressure was released and subsequently, at 90°C inside temperature, 1.65 kg/h of ethylene were introduced with a quantity of hydrogen such that the hydrogen concentration in the reactor was 5 percent by volume. After 1 ½ hours a pressure of 9.8 kg/cm² was reached. The pressure was released and 13.1 kg of copolymer was obtained which was mixed with 1 kg of homopolymer. This experiment was repeated twice whereby in each case 1 kg of the product obtained in the previous experiment was used as initial product. After the third experiment the block polymer contained only a minor part of homopolymer. It had a reduced specific viscosity of 4.4 dl/g (0.1 percent in decahydro naphthalene, 135°C). The ethylene portion of the block polymer was 18.2 percent by weight. The mechanical properties of the block polymer were remarkable: a ball indentation hardness of 460 kg/cm² was measured (according to DIN 53 456 with 4 mm press plates, 1 kg preliminary load, 5 mm ball, 13.5 kg testing force, measurements after 30 seconds), although in the plate falling test at −30°C a falling height of 90 cm was obtained (falling hammer having a weight of 940 g and a ball diameter of 9 mm, 2 mm injection molded plate, stored for a week at room temperature), ie., a considerable low temperature tenacity was reached.

EXAMPLE 3

Under the conditions of Example 1, 2.3 kg/h of propylene, 30 g/h of ethylene and a quantity of hydrogen such that its content was 0.7 percent by volume in the gas space of the reactor, were introduced at the same time. After 6 hours a pressure of 23 kg/cm² was reached and the polymerization was interrupted by cooling and pressure release. 11.8 kg of statistical copolymer were obtained in admixture with 1 kg of homopolymer. After repeating twice as in Example 2, the product had an ethylene content of 2.3 percent by weight and a reduced specific viscosity of 3.6 dl/g (0.1 percent in decahydro naphthalene, 135°C). Although the crystallite melting point of the copolymer was lowered to 152°C, a value of 420 kg/cm² was measured, for the ball indentation hardness, due to the good stereospecificity.

EXAMPLE 4

With the exclusion of air and moisture 1 liter of a gasoline fraction (boiling point 140° to 165°C) was placed in a 2 liter vessel, provided with stirrer, thermometer and gas inlet tube, the vessel was rinsed with pure nitrogen and subsequently saturated at 55°C with propylene. Then 10 mmols of aluminium triethyl, 1.5 mmols of sarcosine anhydride and 5 mmols of $TiCl_3$.1/3 $AlCl_3$ were added one after another. Polymerization was carried out while constantly introducing propylene at first at 55°C. After 30 minutes the temperature was raised to 75°C and the polymerization was carried out for a total of 5 hours at this temperature. After the addition of 40 ml of isopropanol the mixture was stirred for a further hour at 75°C and drawn off by suction while hot. After thorough washing with hot dispersion agent and acetone as well as drying in the vacuum at 70°C 181 g of polypropylene were obtained. The solid contained 2.0 percent of heptane soluble material (24 hours extraction in a Soxhlet) and had a reduced specific viscosity of 9.1 dl/g (0.1 percent in decahydronaphthalene, 135°C). After concentration of the mother liquor in a vacuum a residue of 10 g of atactic polypropylene was obtained.

Comparative example

Under the conditions specified in Example 1, propylene was polymerized using a catalyst system consisting of 72 mmols of aluminium triethyl, 21.6 mmols of N,N-dimethyl formamide and 18 mmols of $TiCl_3.1/3\ AlCl_3$. After 2 hours and 10 minutes the pressure rose to 20 kg/cm². The total duration of the polymerization was 7 hours. Then the pressure was released and 7.8 kg of polypropylene were obtained which corresponded to a net yield of 6.8 kg. The product had a reduced specific viscosity of 2.3 dl/g (0.1 percent in decahydro naphthalene, 135°C) and contained 20.3 percent heptane soluble material (24 hours extraction in the soxhlet). After a storage time of 3 months a weak amine odor was noticeable, which grew considerably stronger while the polymer was being extruded (screw temperature 200°C, nozzle temperature 230°C). When replacing the catalyst component N,N-dimethyl formamide was replaced by dimethyl aniline the disagreeable odor was much stronger. Furthermore, the formation of a greenish deposit on the reactor wall and on the fittings was noticed when the polymerization was carried out several times with dimethylaniline catalyst. After 10 experiments a decrease in yield to 35 percent of the original value was observed. After removing the coating with methanol the original yield was again obtained.

What is claimed is:

1. In a process for the preparation of a crystalline polyolefin by polymerization of at least one α-olefin of the formula $CH_2=CH-R$, wherein R represents an aliphatic radical having one to four carbon atoms, in suspension or in the gas phase, at a temperature of from 20° to 130°C. and a pressure of from 1 to 50 kg/cm², the improvement which comprises carrying out the polymerization in the presence of a mixed catalyst prepared from
   a. a halogen compound of trivalent titanium (component A)
   b. a halogen-free organo-aluminum compound (component B) and
   c. a cyclic dipeptide derivative of the formula

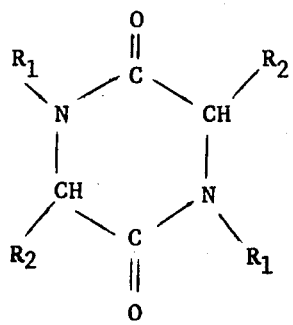

wherein $R_1$ represents $C_6H_5-CH_2$ or $C_nH_{2n+1}$ and n = 1 to 4 and $R_2$ represents H, $C_6H_5-CH_2$ or $C_nH_{2n+1}$ and n = 1 to 4 (component C).

2. In a process for the preparation of a crystalline polyolefin by polymerization of at least one α-olefin of the formula $CH_2=CH-R$, wherein R represents an aliphatic radical having one to four carbon atoms, in suspension or in the gas phase, at a temperature of from 20° to 130°C. and a pressure of from 1 to 50 kg/cm², the improvement which comprises carrying out the polymerization in the presence of a mixed catalyst prepared from
   a. a halogen compound of trivalent titanium (component A)
   b. a halogen-free organo-aluminum compound (component B) and
   c. a cyclic dipeptide derivative of the formula

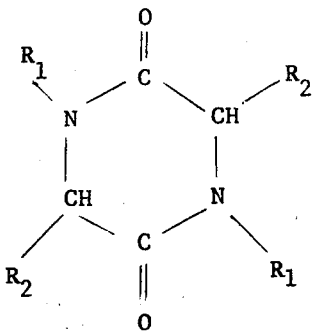

wherein $R_1$ represents $C_6H_5-CH_2$ or $C_nH_{2n+1}$ and $n = 1$ to 4, and $R_2$ represents H, $C_6H_5-CH_2$ or $C_n H_{2+1}$ and n = 1 to 4 (component C) and
   d. a phosphoric acid-N-alkyl amide of the formula

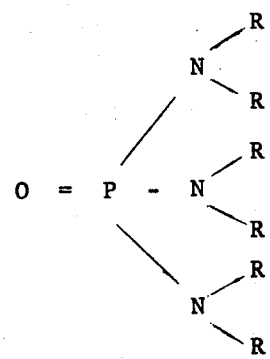

wherein R represents identical or different aliphatic hydrocarbon radicals having up to four carbon atoms and wherein the radicals R can also be connected with one another (component D).

3. The process as claimed in claim 1, wherein the monomers are introduced at the same time into the polymerization, and from 0.5 to 6 percent by weight of ethylene is additionally used.

4. The process as claimed in claim 1, wherein the monomers are introduced alternately into the polymerization and from 5 to 35 percent by weight of ethylene is additionally used.

* * * * *